United States Patent [19]

Hansen

[11] 4,188,164

[45] Feb. 12, 1980

[54] TOTE-TRAILER WITH WHEEL LOCKING DEVICE

[75] Inventor: Loren F. Hansen, Lincoln, Nebr.

[73] Assignee: Outboard Marine Corporation, Waukegan, Ill.

[21] Appl. No.: 909,278

[22] Filed: May 24, 1978

[51] Int. Cl.² ............................................. B60P 3/00
[52] U.S. Cl. .................................. 414/447; 280/46; 254/8 R; 254/131; 414/467
[58] Field of Search .............. 280/47.24, 46; 254/8 R, 254/131; 414/444, 447, 457, 482, 467

[56] References Cited

U.S. PATENT DOCUMENTS

| 682,647 | 9/1901 | Scullin | 280/46 X |
|---------|--------|---------|----------|
| 2,493,230 | 1/1950 | Dilley | 414/457 |
| 3,667,728 | 6/1972 | Garelick | 254/131 X |

Primary Examiner—Albert J. Makay
Attorney, Agent, or Firm—Michael, Best & Friedrich

[57] ABSTRACT

Disclosed herein is a trailer for carrying a machine having a frame supported by a wheel, the trailer including a trailer frame having a forward frame end and a rearward frame end, and a ground engaging trailer wheel attached to the frame adjacent the rearward frame end for supporting the trailer frame for movement on the ground and supporting the trailer frame for movement between a generally vertical position wherein the machine can be attached to the trailer frame and a generally horizontal position wherein the machine can be supported on the trailer frame. The trailer also includes means for supporting the machine wheel connected to the trailer frame adjacent the trailer wheel, and a pivotable locking arm supported by the frame for releasably restraining the machine wheel on the wheel supporting means, the pivotable locking arm being movable between a first position wherein the machine wheel is restrained against the wheel supporting means and a second position spaced from the first position.

8 Claims, 4 Drawing Figures

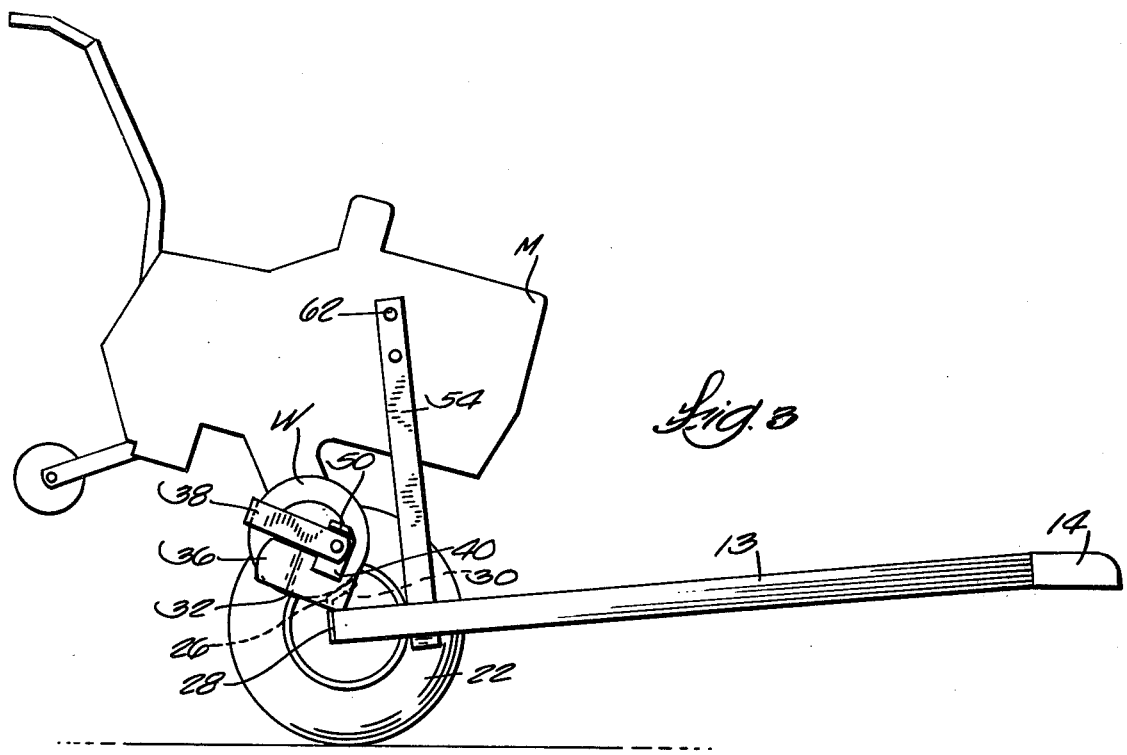
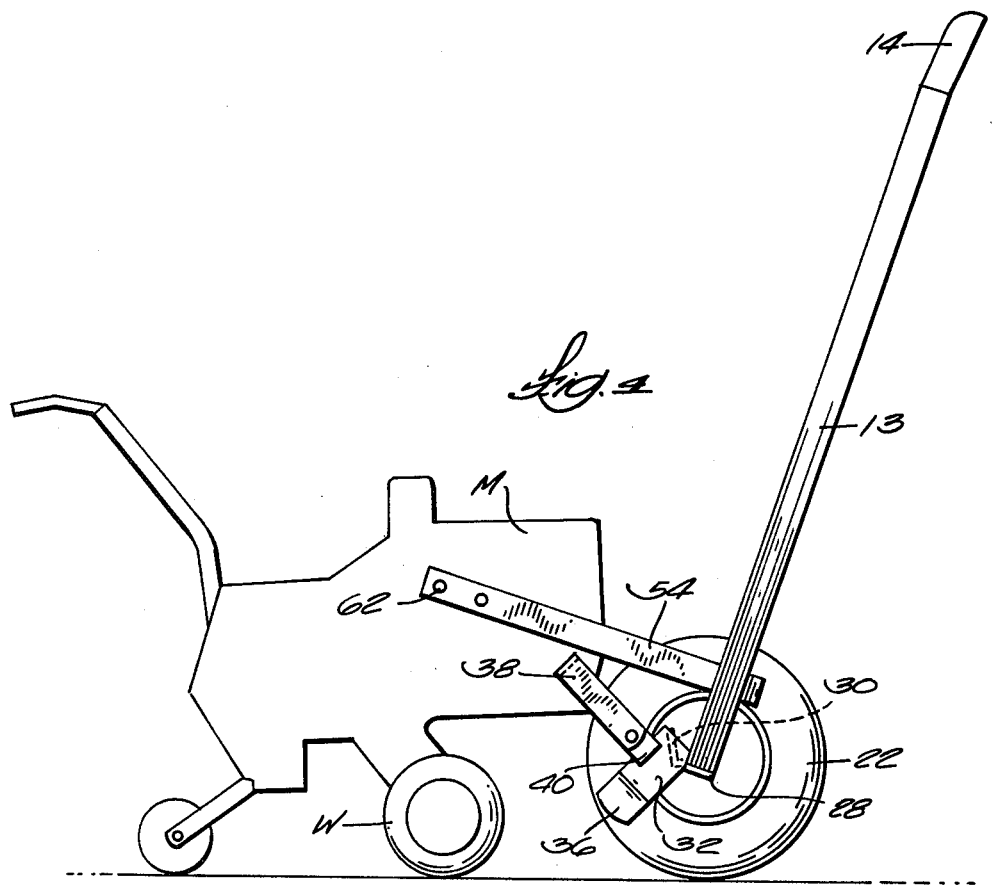

TOTE-TRAILER WITH WHEEL LOCKING DEVICE

BACKGROUND OF THE INVENTION

The invention relates generally to trailers and more particularly to trailers for use in transporting machines such as lawn and garden equipment and including such machines as sod cutters.

Transporting lawn and garden machines has generally required the use of a truck or flatbed trailer. Loading the machine onto such transport means and securing the machine in place during transport may be difficult. Furthermore, lawn and garden machines are normally relatively small and use of a truck or a large trailer is generally unnecessary.

U.S. Pat. No. 3,862,695, issued Jan. 28, 1975 to Elliott illustrates a trailer for moving a piano, the trailer being adapted for pivotal movement to a vertical position wherein the piano can be attached to the trailer. The trailer is then to be lowered to a horizontal position wherein the piano is supported on the trailer for movement.

U.S. Pat. No. 3,797,685 issued Mar. 19, 1974 to Frost illustrates a vehicle towing trailer having wheel wells for supporting two wheels of a vehicle and a chain intended to be wrapped around at least one of the wheels to secure the wheel in the wheel well.

U.S. Pat. No. 2,624,483 issued Jan. 6, 1953 to Ketzel shows a wheel mounted carrier or trailer for transporting welding outfits. The trailer shown therein is pivotable about its rearward end for loading and unloading tanks of compressed gas.

Attention is also directed to the following U.S. Pat. Nos.:
Ward—1,873,690—Aug. 23, 1932
Horn et al—2,661,108—Dec. 1, 1953
Larson—2,776,063—Jan. 1, 1957
McConnell—3,037,650—June 5, 1962
Johnson et al—3,361,277—Jan. 2, 1968
Yamazaki—3,417,890—Dec. 24, 1968
Rousseau et al—3,606,371—Sept. 20, 1971
Kannady et al—3,985,253—Oct. 12, 1976

SUMMARY OF THE INVENTION

The invention provides a trailer for carrying a machine having a frame supported by a wheel, the trailer including a trailer frame having a forward frame end and a rearward frame end, and a ground engaging trailer wheel attached to the frame adjacent the rearward frame end for supporting the trailer frame for movement on the ground and supporting the trailer frame for movement between a generally vertical position wherein the machine can be attached to the trailer frame and a generally horizontal position wherein the machine can be supported on the trailer frame. The trailer also includes means for supporting the machine wheel connected to the trailer frame adjacent the trailer wheel, and a pivotable locking arm supported by the frame for releasably restraining the machine wheel on the wheel supporting means, the pivotable locking arm being movable between a first position wherein the machine wheel is restrained against the wheel supporting means and a second position spaced from the first position.

One of the principal features of the invention is the provision in a trailer of an elongated generally upright support arm having opposite ends and extending transversely to the trailer frame, one of the arm ends being fixed to the trailer frame and the other of the arm ends being adapted to engage the machine for securing the machine to the trailer.

Another of the principal features of the invention is the provision in the pivotable locking arm, of an arm portion having opposite ends, one of the opposite arm portion ends being pivotally connected to the wheel support means and a restraining arm member connected to the other of the opposite arm portion ends and extending transversely to the arm portion for restraining the machine wheel against the wheel support means.

Another of the principal features of the invention is the provision in the frame of a rear frame member having a longitudinal axis extending transversely to the direction of movement of the trailer and wherein the wheel support means is secured to the rear frame member and includes a support plate secured to the rear frame member for supporting the machine wheel, and a wheel guide member positioned adjacent the support plate, the wheel guide member including a generally vertical plate portion located adjacent the machine wheel to prevent lateral movement of the machine wheel.

Another of the principal features of the invention is the provision in a trailer of detent means for releasably maintaining the pivotable locking arm in the first position.

Other features and advantages of the embodiments of the invention will become apparent to those skilled in the art upon reviewing the following detailed description, the drawings and the appended claims.

BRIEF DESCRIPTION OF THE DRAWINGS

FIG. 3 is a side elevation view of the trailer shown in FIG. 1 supporting a sod cutting machine thereon.

FIG. 4 is a view similar to FIG. 3 but showing the trailer tilted to a generally vertical position for loading the sod cutting machine onto the trailer.

Figure 1:
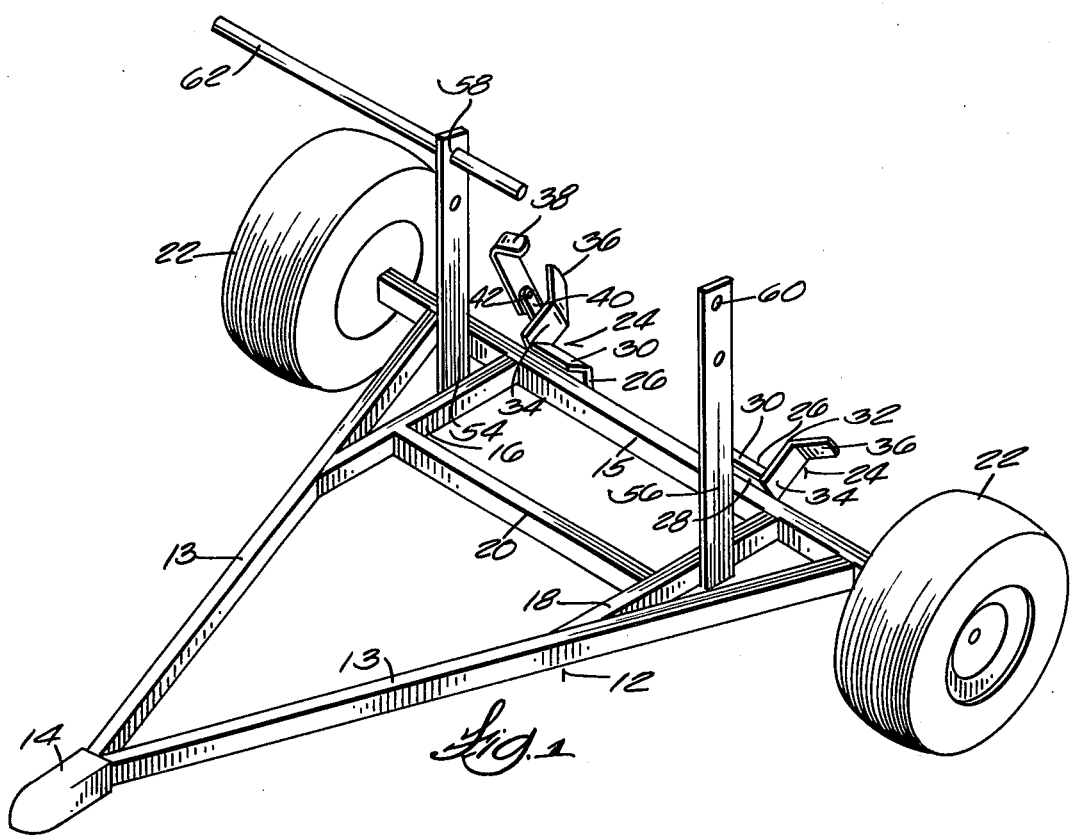
FIG. 1 is a perspective view of the trailer of the invention.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Illustrated in the drawings is a trailer 10 for use in transporting machines such as lawn and garden implements. FIG. 3 particularly illustrates the trailer 10 as supporting a sod cutting machine M. Trailer 10 can also be used in supporting various other lawn and garden machines and the sod cutting machine M illustrated is shown only as an example of machines of the type which can be advantageously transported by the trailer 10.

Referring to FIG. 1, the trailer 10 includes a frame 12 having a forward end including a tongue 14 adapted for attachment to a towing vehicle. The frame 12 is generally triangular and includes a pair of side frame members 13 converging at their forward ends and rigidly attached to the tongue 14. The opposite or rearward ends of the side frame member 13 are spaced apart and are joined by a rear transverse member 15. The frame 12 also includes a pair of spaced parallel frame support members 16 and 18 each having a longitudinal axis extending in the direction of movement of the trailer 10, the frame support member 16 being joined at its rearward end to the transverse frame member 15 and joined at its forward end to the side frame member 13 intermediate the ends thereof. The other frame support member 18 is attached at its rearward end to the transverse frame member 15 and is joined at its forward end to the other side frame member 13 intermediate the opposite ends thereof. The parallel frame support members 16 and 18 are supported intermediate their opposite ends by a transverse supporting member 20 having its ends rigidly secured by welding or the like to the respective frame members 16 and 18.

The trailer 10 also includes a pair of wheels 22 rotatably attached to the opposite ends of the transverse frame members 15 and for supporting the frame 12 for movement along the ground.

A pair of machine wheel support members 24 are attached to the rear transverse frame member 15 in spaced relation and are each positioned against the rearwardly vertical planar surface 25 of the frame member 15. The machine wheel support members 24 are intended to provide support for the wheels W of a machine such as the sod cutter M shown in FIG. 3.

The machine wheel support members 24 each include a wheel support plate 26 having a generally vertical planar lower portion 28 secured to the rear transverse frame member 15 and an integrally attached upwardly and forwardly inclined portion 30 extending above the rear transverse frame member 15 and providing a forwardly inclined supporting surface for a wheel W of the machine M to be supported on the trailer.

Each of the machine wheel support members 24 also respectively includes a side plate 32 extending upwardly from the outer edge of the wheel support member 24. The side plates 32 are generally intended to prevent lateral movement of the machine wheels W when the machine M is supported on the trailer 10 and also to provide means for guiding the machine wheels W into engagement with the wheel support plates 26 when the machine M is loaded onto the trailer. The side plates 32 include a vertical planar portion 34 extending generally perpendicular to the support members 24 and further include a rearwardly and outwardly extending flared portion 36 integral with the planar support plate portion 34.

The trailer also includes a pivotable locking arm 38 attached to one of the side plates 32 and intended to maintain one of the wheels W of machine M supported on the trailer engaged against the wheel support plate 26 to prevent the wheel W from moving with respect to the trailer 10 while the machine M is being transported. The pivotable locking arm 38 is connected to an upper part of the side plate 32 by a support plate 40 which is welded or otherwise rigidly joined to the side plate 32 and extends upwardly from its upper part. A horizontal pivot pin 42 extends through aligned bores in the support plate 40 and in an end of the pivotable arm 38, thereby providing pivotable support for the pivotable arm 38. The pivotable locking arm 38 further includes a restraining arm portion 44 integrally connected to and extending generally perpendicularly to the free end of the pivotable arm 38, the restraining arm portion 44 intended to be received against the periphery of a wheel W of the machine supported on the trailer 10 to prevent rearward movement of the machine M and to engage the wheel W against the wheel support plate 26.

Figure 2:
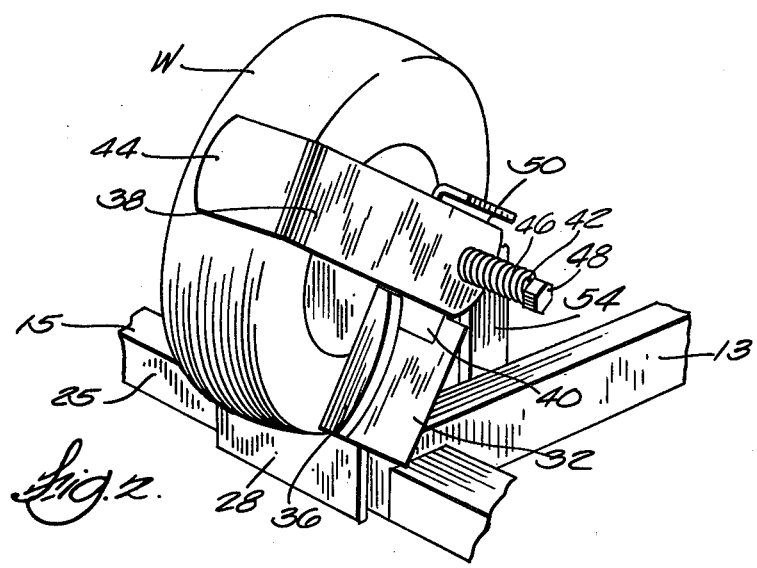
FIG. 2 is an enlarged perspective view of the pivotal locking arm of the trailer shown in FIG. 1 engaging a wheel of a sod cutter.

A detent mechanism is operable in combination with the pivotable locking arm 38 and is functional to maintain the locking arm in the machine wheel restraining position shown in FIGS. 2 and 3. A coil spring 46 is provided between the head 48 of the pivot pin 42 and the surface of the pivotable locking arm 38 to bias pivotable locking arm 38 against the supporting plate 40. The support plate 40 includes a transverse detent projection 50 which extends from the upper edge of the support plate 40 and toward the pivotable locking arm 38. The detent projection 50 engages the pivotable locking arms 38 when it is in its rearward wheel restraining position and releasably prevents movement of the pivotable locking arm 38 from its rearward position to its forward position.

The trailer 10 also includes a pair of upwardly extending elongated support arms 54 and 56. The lower ends of the support arms 54 and 56 are rigidly attached to the respective frame support members 16 and 18. The support arms 54 and 56, respectively include, at their upper ends, axially aligned bores 58 and 60 intended to be aligned with an opening provided in the sod cutter M. The aligned bores 58 and 60 receive opposite ends of a restraining rod 62 intended to project through the opening in the sod cutter M and through the aligned bores 58 and 60 in the support arms 54 and 56 to thereby provide a means for restraining the sod cutter M with respect to the trailer 10.

In operation, the machine M to be transported on the trailer 10 is loaded onto the trailer by pivoting the trailer frame 12 about the axis of the trailer wheels 22 such that the tongue 14 extends upwardly as shown in FIG. 4. The machine can then be positioned with the restraining rod receiving opening through the machine M in alignment with the bores 58 and 60 in the upper ends of the elongated support arms 54 and 56, whereby the restraining rod 62 can be inserted through the aligned bores 58 and 60 and through the opening provided in the sod cutting machine M. The trailer frame 12 is then pivoted about the axis of the wheels 22 to a horizontal position wherein the trailer tongue 14 can be attached to a towing vehicle (not shown). The pivotable locking arm 38 can then be pivoted to the position shown in FIG. 2 wherein the arm 38 functions to prevent rearward movement of the machine wheels W and relative movement between the machine wheels W and the wheel support plates 26.

Various of the features of the invention are set forth in the following claims.

What is claimed is:

1. A trailer for carrying a machine having a frame supported by a wheel, said trailer comprising a trailer frame having a forward frame end and a rearward frame end, a ground engaging trailer wheel attached to said trailer frame adjacent said rearward frame end for supporting said trailer frame for movement on the ground and supporting said trailer frame for movement between a generally vertical position and a generally horizontal position, first means for supporting the machine on said frame in a position entirely off the ground when said trailer frame is in the generally horizontal position, second means for supporting the machine wheel connected to said trailer frame adjacent said trailer wheel, and a pivotable locking arm supported by said frame for releasably restraining the machine wheel on said wheel supporting means, said pivotable locking arm being movable between a first position wherein the machine wheel is restrained against said wheel supporting means and a second position spaced from the first position.

2. A trailer as set forth in claim 1 and said first means includes an elongated generally upright support arm having opposite ends and extending transversely to said trailer frame, one of said arm ends being fixed to said trailer frame and the other of said arm ends being adapted to engage the mechine for securing the machine to said trailer.

3. A trailer as set forth in claim 2 and further including a second elongated support arm connected to said trailer frame, said first and second elongated support arms being positioned to receive the machine therebetween and said elongated support arms having aligned bores therethrough, and a restraining rod extending through said aligned bores for engagement with the machine for restraining the machine.

4. A trailer as set forth in claim 1 wherein said pivotable locking arm includes an arm portion having opposite ends, one of said opposite arm portion ends being pivotally connected to said wheel support means and a restraining arm member connected to the other of said opposite arm portion ends and extending transversely to said arm portion and for restraining the machine wheel against said wheel support means.

5. A trailer as set forth in claim 1 wherein said frame includes a rear frame member having a longitudinal axis extending transverse to the direction of movement of the trailer and wherein said wheel support means is secured to said rear frame member and includes a support plate including a first portion secured to said rear frame member and a second portion for supporting the machine wheel, and a wheel guide member positioned adjacent said support plate, saie wheel guide member including a generally vertical plate portion positionable adjacent the machine wheel to prevent lateral movement of the machine wheel.

6. A trailer as set forth in claim 5 wherein said pivotable locking arm includes an arm portion having opposite ends, one of said opposite ends being pivotally connected to said wheel guide member and a restraining arm member connected to the other of said opposite ends and extending transversely to said arm portion for restraining the machine wheel against said wheel support means.

7. A trailer as set forth in claim 1 and further including detent means for releasably maintaining said pivotable locking arm in said first position.

8. A trailer for carrying a machine having a frame supported by a wheel, said trailer comprising a trailer frame having a forward frame end, a tongue supported on said forward frame end and providing means for attachment of said trailer to a towing vehicle, and a rearward frame end, a ground engaging trailer wheel attached to said trailer frame adjacent said rearward frame end for supporting said trailer frame for movement on the ground and supporting said trailer frame for movement between a generally vertical position wherein the machine can be attached to said trailer frame and a generally horizontal position wherein said machine can be supported on said trailer frame, a wheel supporting means connected to said trailer frame adjacent said trailer wheel, said wheel supporting means including a support plate for supporting the machine wheel thereon, a pivotable locking arm supported by said trailer frame for releasably restraining the machine wheel on said wheel support plate, said pivotable locking arm being movable between a first position wherein the machine wheel is restrained on said wheel support plate and a second position spaced from said first position, said pivotable locking arm including an arm portion having opposite ends, on of said opposite ends being pivotally connected to said wheel supporting means, said locking arm also including a restraining arm member connected to the other of said opposite ends and extending transversely to said arm portion for restraining the machine wheel on said wheel support plate, a generally upright elongated support arm having opposite ends, and extending transversely to said frame, one of said ends being fixed to said frame and the other of said ends being adapted to be attached to the machine for securing the machine to the trailer, and detent means for releasably maintaining said pivotable locking arm in said first position.

* * * * *

UNITED STATES PATENT AND TRADEMARK OFFICE
CERTIFICATE OF CORRECTION

PATENT NO. : 4,188,164
DATED : February 12, 1980
INVENTOR(S) : Loren F. Hansen

It is certified that error appears in the above-identified patent and that said Letters Patent are hereby corrected as shown below:

Column 5, line 15      "mechine" should be ---machine---

Column 5, line 41      "saie" should be ---said---

Column 6, line 33      "on" should be ---one---

Signed and Sealed this

Seventeenth Day of June 1980

[SEAL]

Attest:

Attesting Officer

SIDNEY A. DIAMOND

Commissioner of Patents and Trademarks